United States Patent [19]

Menke et al.

[11] Patent Number: 5,757,761
[45] Date of Patent: May 26, 1998

[54] DISC PLAYER FOR PLAYER DISCS DISPOSED IN CASSETTES DEFINING A WINDOW OPENING AND CLOSEABLE BY A SLIDING ELEMENT

[75] Inventors: Wilhelm Menke; Boerge Heidersberger, both of Bingen, Germany

[73] Assignee: NSM Aktiengesellschaft, Bingen, Germany

[21] Appl. No.: 586,786

[22] PCT Filed: Jun. 27, 1994

[86] PCT No.: PCT/DE94/00746

§ 371 Date: Jan. 23, 1996

§ 102(e) Date: Jan. 23, 1996

[87] PCT Pub. No.: WO95/03608

PCT Pub. Date: Feb. 2, 1995

[30] Foreign Application Priority Data

Jul. 23, 1993 [DE] Germany .................. 43 24 804.7

[51] Int. Cl.[6] .................................................. G11B 17/22
[52] U.S. Cl. .................. 369/178; 369/77.2; 360/98.04
[58] Field of Search ........................... 369/178, 191–192, 369/77.2, 36; 360/92, 98.04

[56] References Cited

U.S. PATENT DOCUMENTS

| 4,768,116 | 8/1988 | Watanabe | 360/98 |
| 4,901,172 | 2/1990 | Nakazawa et al. | 360/98.05 |
| 4,912,575 | 3/1990 | Shiosaki | 369/191 |
| 5,228,016 | 7/1993 | Menke | 369/36 |

FOREIGN PATENT DOCUMENTS

| 0138005 | 4/1985 | European Pat. Off. |  |
| 0439483 | 8/1991 | European Pat. Off. |  |
| 62-124662 | 6/1987 | Japan | 369/36 |
| 90/04845 | 5/1990 | WIPO |  |

*Primary Examiner*—Stuart S. Levy
*Assistant Examiner*—Brian E. Miller
*Attorney, Agent, or Firm*—Spencer & Frank

[57] ABSTRACT

A combination includes a plurality of disc assemblies, each having: a disc; a cassette having a window and a sliding element adapted to open and close the window, the disc being disposed in the cassette so as to be accessible by a playback unit of a disc player through the window. The combination further includes a disc player having: a playback unit; a disk magazine including a plurality of disc compartments disposed to form a stack, each of the compartments being adapted to receive a corresponding one of the disc assemblies therein; a transport device travelling toward and away from the stack for transferring a preselected disc assembly between a corresponding receiving compartment and the playback unit; and a plurality of cassette holders, each holding a corresponding one of the disc assemblies therein and further being adapted to be gripped by the transport device for being transferred between a receiving compartment and the playback unit. Each of the cassette holders further have: a frame; a catch fixed to the frame for moving the sliding element of the cassette into an open position when the corresponding one of the disc assemblies is inserted into the cassette holder; and an elastic projection distinct from the catch fixed to the frame for moving the sliding element into a closed position when the corresponding one of the disc assemblies is removed from the cassette holder.

11 Claims, 6 Drawing Sheets

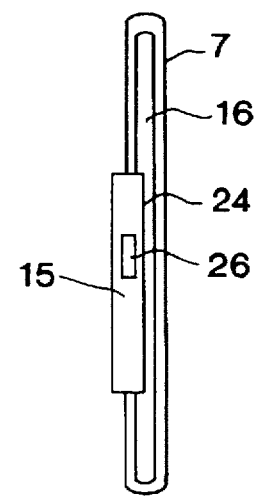
FIG. 7B    FIG. 7A
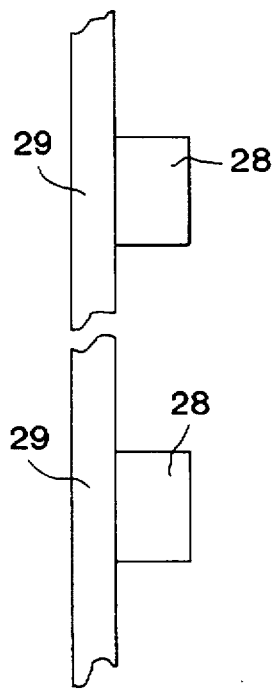
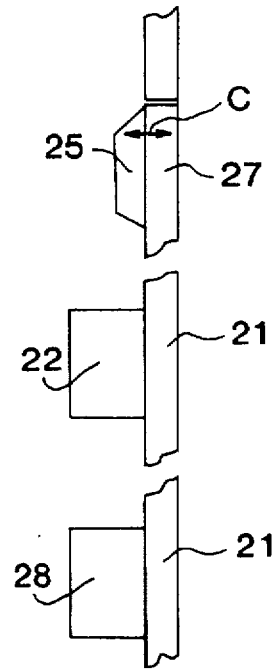
FIG. 8B    FIG. 8A

DISC PLAYER FOR PLAYER DISCS DISPOSED IN CASSETTES DEFINING A WINDOW OPENING AND CLOSEABLE BY A SLIDING ELEMENT

FIELD OF THE INVENTION

The invention relates to a disc player having at least one disc magazine which contains a plurality of discs lying in receiving compartments one on top of the other, and further having a transport device which can travel in the direction of the stack of the disc magazine for transferring a desired disc between the receiving compartment and a playback unit.

BACKGROUND OF THE INVENTION

Disc players of the above type are known in a wide variety of embodiments. For example, EP 0 439 483 B1 shows a disc player having two disc magazines which are located opposite each other and include a plurality of disc holders which are seated in receiving compartments one above the other and each receive one disc, the device further including a transport device which can be moved in the direction of the stack of the disc magazines for conveying a disc, with the associated disc holder, back and forth between the disc magazines and a playback unit. The discs are therefore first placed into the disc holders, and the disc holders respectively occupied by a disc are subsequently inserted into the receiving compartments of the disc magazines. Usually, so-called CDs (compact discs) are involved, which have a long playing time, but nevertheless a small diameter of up to 8 cm, which permits the use of a playback unit and disc magazines of compact construction, so that the disc playback device has a relatively small overall size.

Moreover, in the interim a disc player has become known which plays a disc while it is held in a flat cassette serving to protect it. The cassette is provided on one hand with an access opening, through which the disc is gripped by the playback unit and rotated, and on the other hand with a window, through which the disc can be scanned while it rotates in the cassette by the playback head of the playback unit. In the unused state of the cassette, the window is closed by a sliding element integrated into the cassette, and is opened by a suitable mechanism when the cassette is inserted into the disc player and closed again when the cassette is withdrawn after the disc has been played. The discs accommodated in the protective cassettes are typically so-called mini-compact discs, which have an extremely long playing time but nevertheless a small diameter of up to 6 cm. The type of discs which are received in protective cassettes cannot be played in the disc players known up to now that include a large number of disc magazines which receive discs, particularly because these disc players do not possess any of the complex mechanisms disposed upstream of the playback unit for the purpose of operating the sliding element of the cassette.

SUMMARY OF THE INVENTION

The object of the invention is to create a disc player of the type mentioned at the outset with which discs received in flat protective cassettes can be played without a large structural outlay.

In accordance with the invention, this object is accomplished in that

— each disc is accommodated so as to rotate in a manner known per se in a cassette having at least one window which is associated with the playback head of the playback unit and can be closed by a sliding element, — each cassette is inserted into a cassette holder which is seated in the receiving compartment of the disc magazine and can be gripped by the transport device, and — each cassette holder is provided on the one hand with a catch which transfers the sliding element into the open position when the cassette is inserted into the cassette holder, and on the other hand with an elastic projection which transfers the sliding element into the closed position when the cassette is withdrawn from the cassette holder.

The result of these measures is a structurally simple and compact disc player which permits the playback of discs accommodated in special cassettes. The cassette holder assures, on the one hand, a narrow stack spacing of the cassette holders with respect to each other and, on the other hand, reliable opening and closing of the sliding element. In the working position of the cassette, that is, in the state of the cassette being inserted into the cassette holder, the window of the cassette is kept open, making the disc available for playback, while in the non-working state of the cassette, that is, when the cassette is removed from the cassette holder, the window of the cassette is closed, protecting the disc completely protected against the effects of dirt.

In an advantageous embodiment of the invention, the sliding element of the cassette is fixed in the closed position by a spring-loaded locking device, and the catch of the cassette holder does not release the locking device until the cassette is inserted into the cassette holder. In this way, a sliding element of the cassette which is locked in the closed position is reliably released from its locked position when the cassette is inserted into the cassette holder.

To assure secure holding of the cassette in the cassette holder, in accordance with a preferred modification of the invention, the cassette holder, which encompasses a frame, has at least two holding ribs located opposite one another in the rear region, when seen in the direction of insertion of the cassette, which extend into corresponding lateral slots of the cassette.

Furthermore, it is preferably provided that the catch is formed on the inside of the side wall of the frame facing the window of the cassette and, when the cassette is inserted into the cassette holder, extends into the corresponding lateral slot of the cassette, pushes down a spring-loaded lever of the locking device, which lever protrudes into this slot, and comes to rest bent segment of the sliding element located in the closed position, which bent segment partly covers the slot. As a result, the window of the cassette can always be opened without problems.

For the implementation of a reliable closing process of the window of the cassette, in accordance with a further advantageous embodiment of the invention, the elastic projection disposed on the inside of the side wall of the frame facing the window of the cassette extends into an associated opening of the bent segment of the sliding element in the state of the cassette being inserted into the cassette holder. When the cassette is pushed out of the cassette holder, the projection carries the sliding element along until the sliding element has assumed its closed position, and the projection subsequently moves out of the opening of the sliding element. The projection is purposefully formed on a resilient tongue swung out of the side wall of the frame. This is simple to execute with respect to production technology. In an alternative embodiment, the projection is configured as a spring-loaded latching pin inserted into the side wall of the frame.

So that an information image applied to the associated cassette can be viewed in the correct, or readable, orientation during playback of a disc, in accordance with a further modification of the subject of the invention, the frame of the cassette holder is provided with a cover wall, into which a recess is cut that corresponds to the size of an information image that is applied to the top side of the cassette and is to be viewed in the correct position during playback of the disc located in the cassette.

For secure seating and shifting of the cassette holder, the frame of the cassette holder preferably has two sliding rails located opposite each other on the outside, transversely to the direction of insertion of the cassette, for support in the receiving compartment of the disc magazine and in the carrier arm of the transport device.

So that, in the case of two oppositely-located disc magazines, the cassette holder can be gripped in a simple manner by the transport device, a gripping pocket for a gripper arm of the transport device preferably adjoins the end of the front sliding rail of the frame, seen in the direction of insertion of the cassette. When the cassette is inserted in the cassette holder, the front sliding rail purposefully extends beyond the outer wall of the cassette facing the sliding rail at a specific height. This reduces a sliding of the cassette back out of the cassette holder, with the front sliding rail serving as a latch for the cassette.

In order to achieve exact positioning of the cassette holder in the disc magazine and in the transport device, in a modification of the invention, a detent notch into which a detent spring of the disc magazine or a detent spring of the carrier arm of the transport device extends is cut into the center of the rear sliding rail of the frame when seen in the direction of insertion of the cassette in the cassette holder.

Of course, the features cited above and those explained below can be used not only in the described combination, but also in other combinations or by themselves, without leaving the scope of the present invention.

BRIEF DESCRIPTION OF THE DRAWINGS

The concept underlying the invention is described in detail in the following description in conjunction with an embodiment illustrated in the drawing. Shown are in.

DETAILED DESCRIPTION OF THE INVENTION

Figure 1:
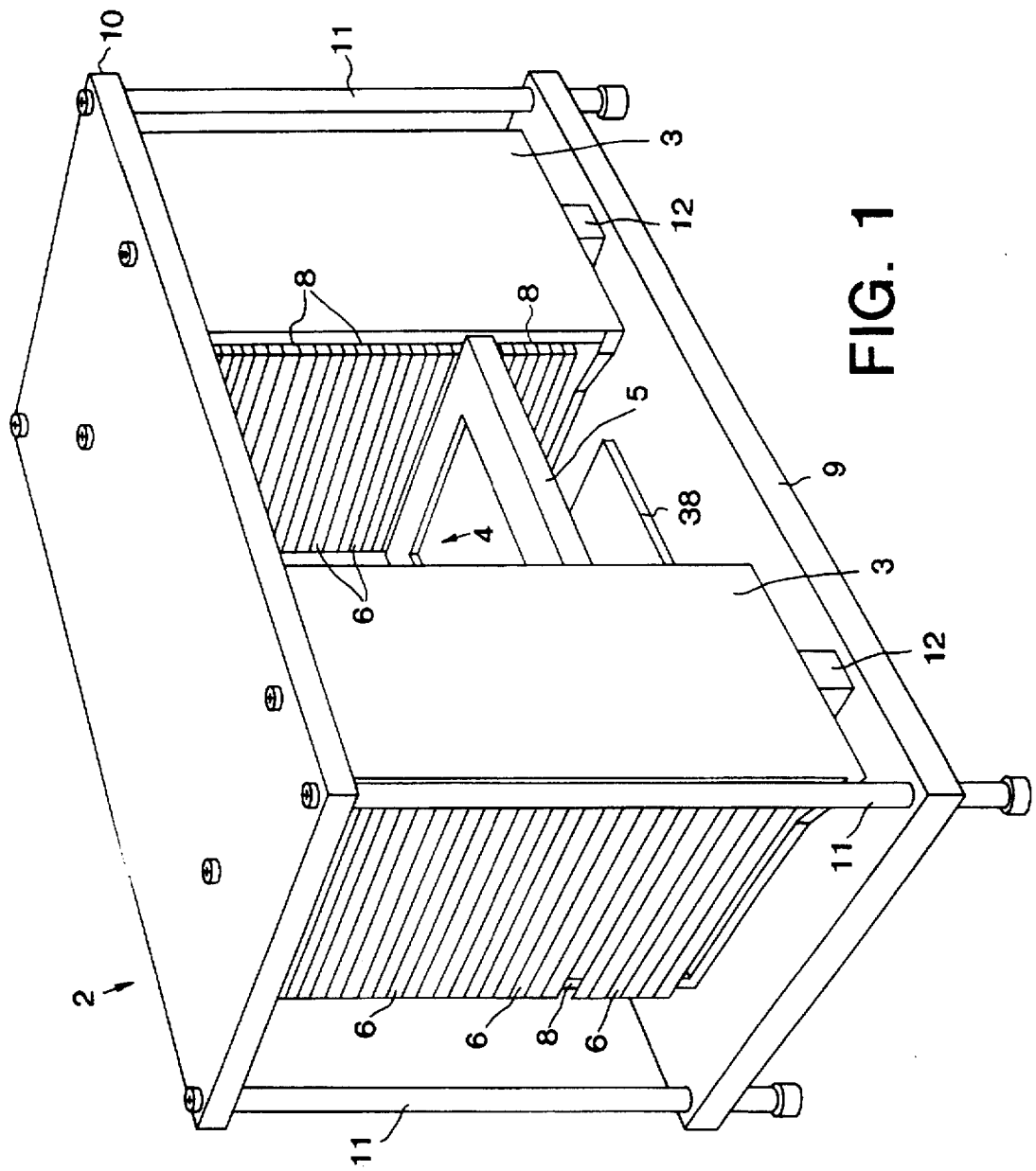
FIG. 1 a perspective view of a disc player according to the invention.
Figure 2:
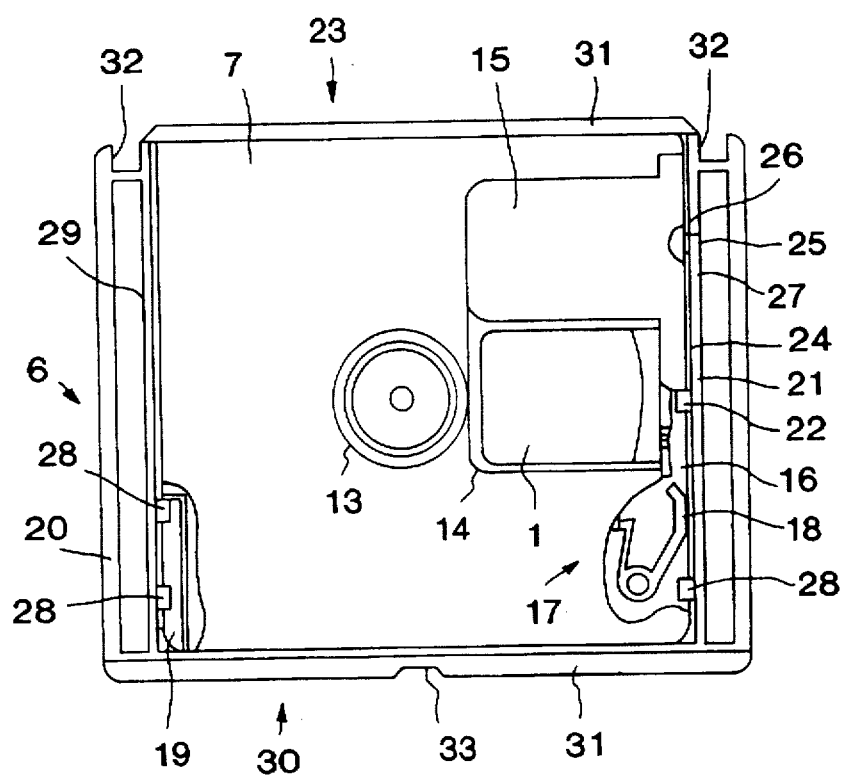
FIG. 2 a bottom plan view of a cassette holder which has an inserted cassette that has been deposited into a disc magazine of the disc player according to FIG. 1, on an enlarged scale and partly in section, FIG. 3a a bottom plan view of the cassette of FIG. 2, FIG. 3b a bottom plan view of the cassette holder for the cassette of FIGS. 2 and 3a, FIG. 4a a bottom plan view of the cassette showing an information image applied to the top side thereof, FIG. 4b a bottom plan view of the cassette holder for the cassette of FIG. 4a, showing a cover wall thereon, FIG. 5 a perspective view of a conventional playback unit used in the disc player of FIG. 1, FIG. 6a a perspective view of conventional features of a transport device which may be used in the disc player of FIG. 1, FIG. 6b a top plan view of a rear portion of the transport device of FIG. 6a equipped with gripper arms shown in schematic form, FIG. 6c a top plan view of a detent notch of the cassette holder of FIG. 2 engaged by a detent spring shown in schematic form, FIG. 7a a side elevational view of the cassette of FIG. 3a seen in the direction of arrow A, FIG. 7b a side elevational view of the cassette of FIG. 3a seen in the direction of arrow B, FIG. 8a a detail of one of the side walls of the cassette holder of FIG. 2, and FIG. 8b a detail of another one of the side walls of the cassette holder of FIG. 2.

As seen in FIG. 1, the disc player equipped with a central control unit, not shown, with which disc player information stored on the discs 1 can be read out and played back, includes a housing 2 having an associated operating panel, not shown, which has different keys, for example, a disc selection key, a disc playback key and a stop key. Disc magazines 3 located opposite each other are disposed laterally in the housing 2. Disposed in the space between the disc magazines 3 is a transport device 4 which can travel up and down and has a carrier arm 5 for a cassette holder 6, into which a cassette 7 which rotatably receives a disc 1 is inserted (FIG. 2). A playback unit 38 having a turntable, not shown in detail, a motor for rotating the turntable, and a playback head, is fixedly disposed between and beneath the two disc magazines 3 located opposite each other.

The disc magazines 3 are of identical construction, and respectively include a plurality of receiving compartments 8 disposed one above the other for storage of a corresponding number of cassette holders 6, each of which receives a corresponding disc assembly including cassette 7 with a disc 1 lying therein it. The cassette holder 6 is secured in its position in the receiving compartment 8 by at least one detent spring disposed on the disc magazine 3. In this position the cassette holder 6 protrudes so far beyond the two sides of the disc magazine 3 from which withdrawal is possible that it can be gripped by a gripper arm 52 of a withdrawal device 44 of the transport device 4 (see FIGS. 6a and 6b). Each disc magazine 3 is inserted into the housing 2 in drawer fashion so as to be exchangeable from the front side of the housing 2. The housing 2 comprises a rectangular floor plate 9 and a rectangular cover plate 10, which is at a specific distance from the floor plate; these plates can be connected to one another by connecting elements 11 configured as rods and disposed at the corners. The cover plate 10 is removable, and the connecting elements 11 are exchangeable in length, so that disc magazines 3 of different heights can be used. Located opposite each other on the inside of the floor plate 9 and the inside of the cover plate 10 are guide rails 12 for each disc magazine 3 which correspond to a groove in the wall of the floor or in the wall of the cover of the disc magazine 3.

Figure 3A:
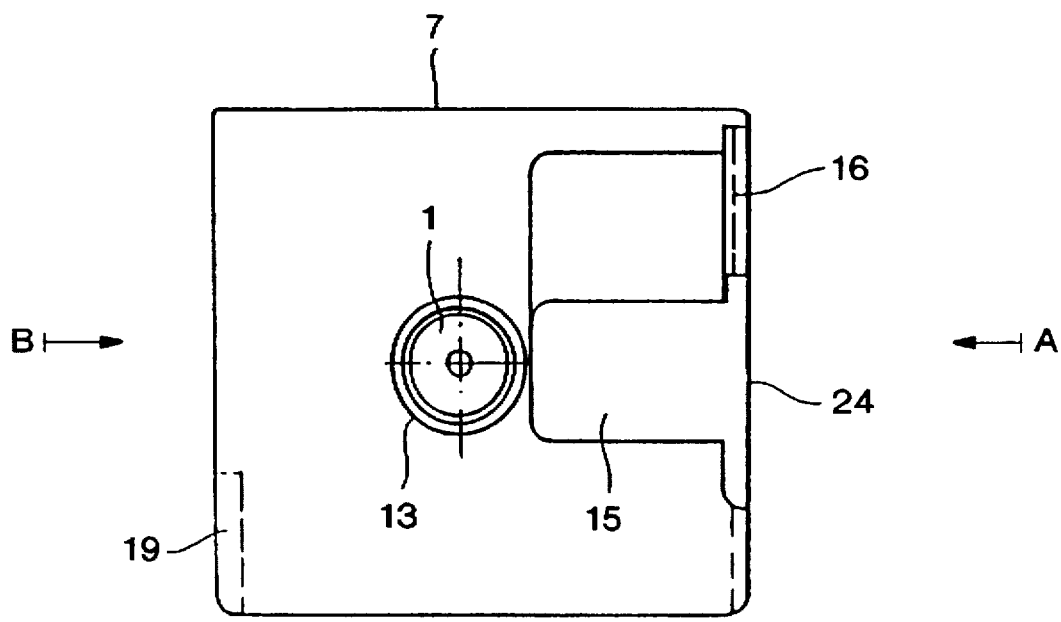

As seen in FIGS. 2 and 3a, rectangular cassette 7 shown in a partially cut-away bottom plan view is closed on all sides and serves to protect the freely-movable disc 1 lying inside it. Cassette 7 is provided on its underside with a central access opening 13, through which the disc 1 can be set into rotation by the turntable of the playback unit 38. A window 14 is located next to the access opening 13 in the underside of the cassette 7; the disc 1 can be scanned through this window by the playback head of the playback unit 38 as it is rotated in the cassette 7. Associated with the window 14 is a sliding element 15 which is integrated into the cassette 7 and by means of which the window 14 can be opened and closed. The sliding element has a bent segment 24 which extends into a first lateral slot 16 of the cassette 7 and cooperates with a locking device 17, shown in a partially cut-away view of the cassette and not in detail, which has a spring-loaded lever 18 that dips into the slot 16 of the cassette 7. To open the window 14, first the locking device 17 must be released; only then can the sliding element be moved into its open position. Located opposite the slot 16 in the one side wall of the cassette 7 is a second lateral slot 19 in the other side wall.

Figure 3B:
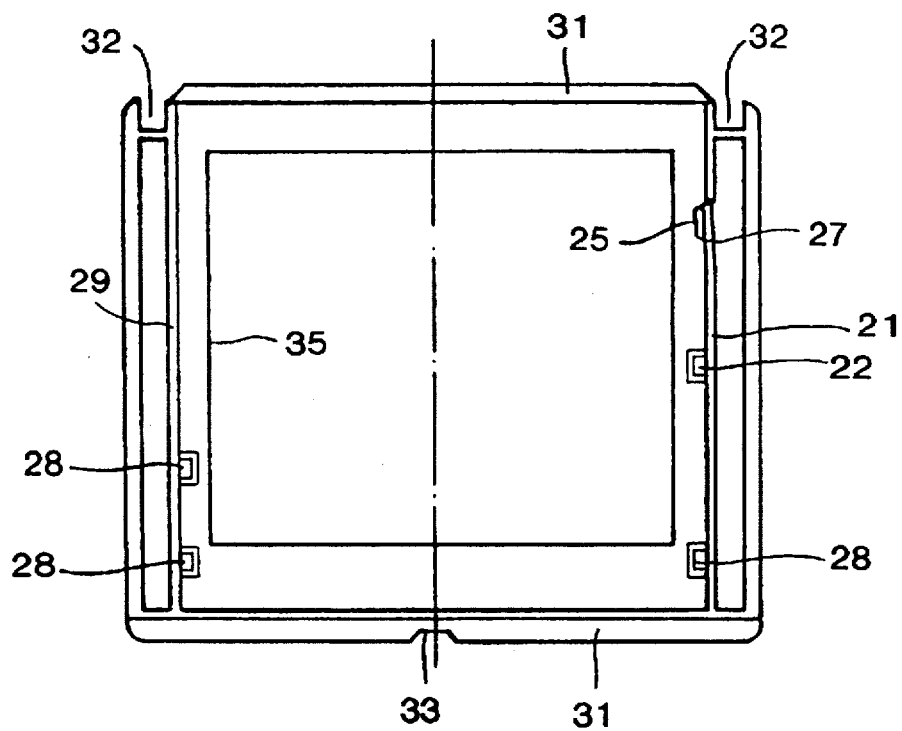

As seen in FIG. 3b, the cassette holder 6 encompasses a frame 20 that receives the cassette 7 and on whose side wall 21 facing the window of the cassette 7 a catch 22 which extends into the slot 16 of the cassette 7 is formed in a position in which it first releases the locking device 17 for the sliding element 15 when the cassette 7 is inserted into the cassette holder 6 from the front side 23 of the cassette holder 6, and then, by virtue of the insertion of the cassette toward the back side 30 moves the sliding element 15 into the open position by means of contact with the bent segment 24 of the sliding element 15. In the open position of the sliding element 15, an elastic projection 25 disposed at an inside region of the side wall 21 of the frame 20 latches into an associated opening 26 of the bent segment 24 of the sliding element 15, and thus holds the sliding element 15 fixedly in its open position. When the cassette 7 is pushed out of the cassette holder 6 in the direction of the front side 23 of the cassette holder 6, the sliding element 15 is transported by the projection 25 into the closed position, in which it is fixed by the locking device 17, and the projection 25 subsequently slides out of the opening 26. The projection 25 is formed on a resilient tongue 27 adapted to swing in and out of the side wall 21 of the frame 20.

Figure 4A:
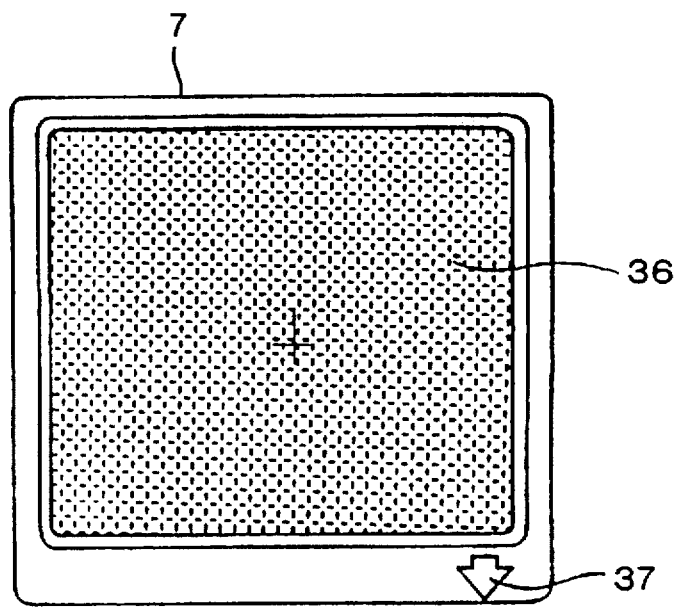
Figure 4B:
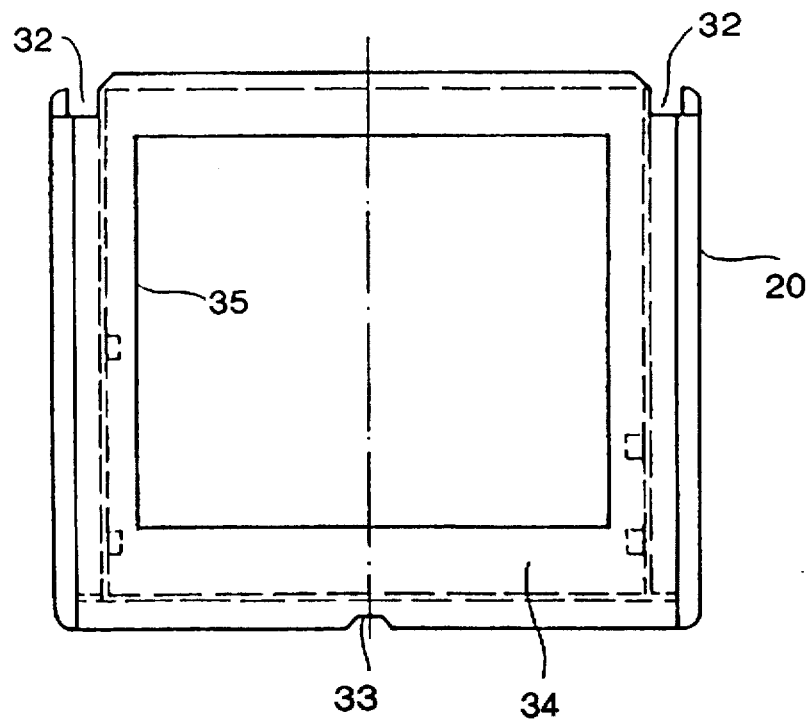

A holding rib 28 formed on the side wall 21 and extending into the slot 16 of the cassette 7 extends in front of the catch 22 of the side wall 21 of the frame 20. Two further holding ribs 28, which are spaced from each other and extend into the slot 19 of the cassette 7, are formed on the side wall 29 of the frame 20 located opposite the side wall 21. Located on both the front side 23 and the rear side 30 of the frame 20 is a sliding rail 31, which serves as a support in the receiving compartment 8 of the disc magazines 3 and in the carrier arm 5 of the transport device 4. Adjoining the end of the front sliding rail 31 when seen in the direction of insertion of the cassette 7 in the cassette holder 6 is a gripping pocket 32, into which a gripper arm of a withdrawal device of the transport device 4 can extend in order to convey the cassette holder 6. In the state of the cassette 7 being inserted into the cassette holder 6, at a specific height the front sliding rail 31 extends beyond the outside wall of the cassette 7 facing the sliding rail 31. The rear sliding rail 31 when seen in the direction of insertion of the cassette 7 into the cassette holder 6 is provided in the center with a detent notch 33. In the end position of the cassette holder 6 in the disc magazine 3, a detent spring correspondingly fixed on the disc magazine extends into the detent notch 33. Likewise, a detent spring 54 fixed on the carrier arm 5 extends into the detent notch 33 in the end position of the cassette holder 6 in the carrier arm 5 of the transport device 4. As seen in FIGS. 4a and 4b, frame 20 of the cassette holder 6 is provided with a cover wall 34, into which a recess 35 is cut which corresponds to the size of an information image 36 applied to the top side of the cassette 7. Moreover, an arrow 37 which indicates the direction of insertion of the cassette 7 into the cassette holder 6 is located on the top side of the cassette 7. The information image 36 of the cassette 7 can therefore be viewed in the correct position during playback of the disc 1 contained in the cassette 7.

Figure 5:
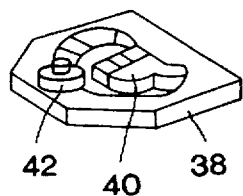

FIG. 5 shows a perspective view of a conventional playback unit 38 which may be used in the disc player of FIG. 1. The playback unit 38 includes a playback head 40 and a rotating turntable 42.

Figure 6A:
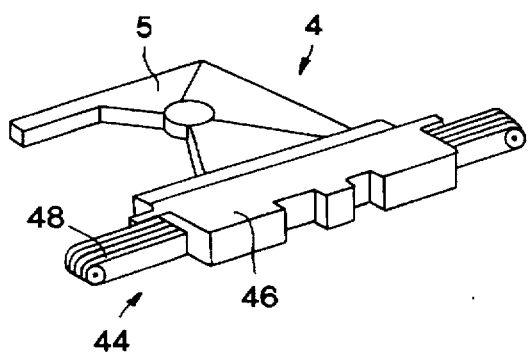

FIG. 6a shows a perspective view of conventional features of a transport device 4 which may be used in the disc player of FIG. 1. The transport device includes the carrier arm 5 and a withdrawal device 44 which includes a bottom portion 46 and a belt drive 48.

Figure 6B:
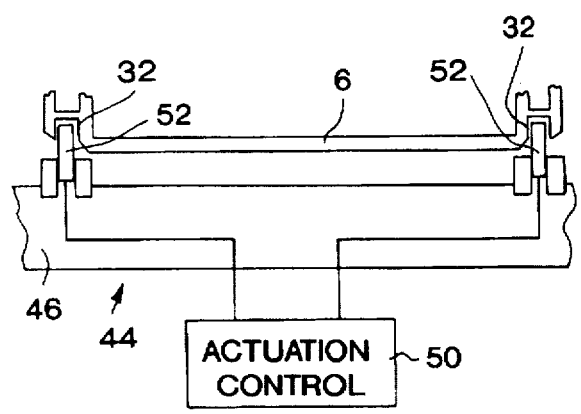

FIG. 6b is a top view of a rear portion of the transport device of FIG. 6a equipped with gripper arms shown in schematic form. As seen in FIG. 6b, bottom portion 46 includes a conventional actuation control mechanism 50 for actuating gripper arms 52 shown in schematic form. As seen in FIG. 6b, gripper arms 52 can engage gripping pockets 32 of cassette holder 6 for holding the cassette holder on the transport device as previously described.

Figure 6C:
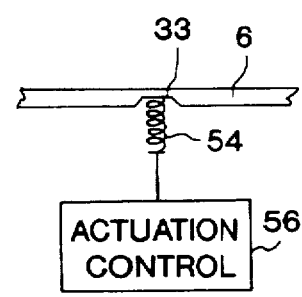

FIG. 6c is a top view of detent notch 33 of cassette holder 6 into which a detent spring 52 (shown in schematic form) of either disc magazine 3 or carrier arm 5 extends by means of a conventional actuation control mechanism 56.

FIG. 7a is a side elevational view of the cassette of FIG. 3a seen in the direction of arrow A, and shows the lateral slot 16 of the cassette 7. Bent segment of 24 of sliding element 15 extends into slot 16 and includes the opening 26 therein as shown.

FIG. 7b is a side elevational view of the cassette of FIG. 3a seen in the direction of arrow B, and shows the slot 19 therein.

FIG. 8a shows a detail of side wall 21 including the resilient portion 27 which swings in and out of the plane of the side wall 21 as shown by arrow "C", and which has the elastic tongue 25 thereon. FIG. 8a further shows both the catch 22 and holding rib 28 adapted to extend into slot 16.

FIG. 8b shows a detail of side wall 29 including holding ribs 28 also adapted to extend into slot 16.

It is noted that at least FIGS. 7a, 7b, 8a and 8b are not necessarily to scale.

We claim:

1. A combination comprising:
  a plurality of disc assemblies, each disc assembly including:
    a disc;
    a cassette defining lateral slots thereon including a first lateral slot and a second lateral slot, the cassette further having a window and a sliding element adapted to open and close the window, the sliding element including a bent segment partly covering the first lateral slot and defining an opening therein, the disc being disposed in the cassette so as to be accessible by a playback unit of a disc player through the window; and
  a disc player for playing the disc including:
    a playback unit adapted to access the disc through the window of the cassette;
    a disk magazine disposed adjacent the playback unit and including a plurality of disc receiving compartments disposed one on top of another to form a stack, each of the receiving compartments being adapted to receive a corresponding one of the disc assemblies therein;
    a plurality of cassette holders, each of the cassette holders holding a corresponding one of the disc assemblies therein and further having:
      a frame including a side wall adapted to be disposed adjacent the sliding element when the corresponding one of the disc assemblies is inserted into the cassette holder;
      a catch fixed to the frame of the cassette holder for moving the sliding element of the cassette into an open position when the corresponding one of the disc assemblies is inserted into the cassette holder; and an elastic projection distinct from the catch and fixed to the frame of the cassette holder for moving the sliding element of the cassette into a closed position when the corresponding one of the disc assemblies is removed from the cassette holder, the elastic projection being disposed on an inside region of the side wall of the frame and extending into the opening of the bent segment when the corresponding one of the disc assemblies is inserted into the cassette holder; and a transport device adapted to travel toward and away from the stack of receiving assemblies for transferring a pre-selected cassette holder between a corresponding receiving compartment and the playback unit by gripping the pre-selected cassette holder.

2. The combination according to claim 1, wherein the cassette further includes a spring-loaded locking device disposed adjacent the sliding element for fixing the sliding element in its closed position, the catch being adapted to release the locking device before moving the sliding element into its open position when the corresponding one of the disc assemblies is inserted into the cassette holder.

3. The combination according to claim 2, wherein:

the locking device includes a spring-loaded lever protruding into the first lateral slot and resting against the bent segment of the sliding element when the sliding element is in its closed position for fixing the sliding element in its closed position; and the catch is formed on an inside region of the side wall and extends into the first lateral slot thereby pushing down the spring-loaded lever of the locking device for releasing the locking device when the corresponding one of the disc assemblies is inserted into the cassette holder.

4. The combination according to claim 1, wherein:

the cassette holder further includes a plurality of holding ribs projecting from the frame and facing one another at a rear region of the cassette holder, the holding ribs extending into corresponding ones of the lateral slots of the cassette when the corresponding one of the disc assemblies is inserted into the cassette holder.

5. The combination according to claim 1, wherein each of the cassette holders further includes a resilient tongue portion fixed to the side wall and adapted to swing in and out of a plane of the side wall, the elastic projection being disposed on the resilient tongue portion.

6. The combination according to claim 1, wherein:

the elastic projection comprises a spring-loaded latching pin disposed in the side wall.

7. The combination according to claim 1, wherein the frame includes a cover wall defining a recess therein, the recess corresponding to a size of an information image applied to a top side of the cassette and adapted to be viewed during playback of the disc disposed in the cassette.

8. The combination according to claim 1, wherein:

the transport device comprises a carrier arm; and the frame includes, on an outside region thereof, a pair of sliding rails comprising a front sliding rail and a rear sliding rail in an insertion direction of the corresponding one of the disc assemblies into the cassette holder, the sliding rails being located opposite one another and oriented transversely to the insertion direction of the corresponding one of the disc assemblies, the sliding rails further being adapted to support the cassette holder inside the corresponding one of the receiving compartments and in the carrier arm of the transport device.

9. The combination according to claim 1, wherein:

the frame defines a gripping pocket adjoining an end region of the front sliding rail; and the transport device further comprises a gripper arm adapted to engage the gripping pocket for gripping the cassette holder.

10. The combination according to claim 1, wherein, at a specific height, the front sliding rail extends beyond a facing outer wall of the cassette when the corresponding one of the disc assemblies is inserted into the cassette holder.

11. The combination according to claim 1, wherein:

the rear sliding rail defines a detent notch at a center region thereof; and the disc magazine and the carrier arm each include a detent spring adapted to extend into the detent notch when the cassette holder is inside the corresponding one of the receiving compartments and in the carrier arm of the transport device, respectively.

* * * * *